July 10, 1962   J. R. PETERS   3,043,053
SELF-WATERING FLOWER POT
Filed Nov. 16, 1959
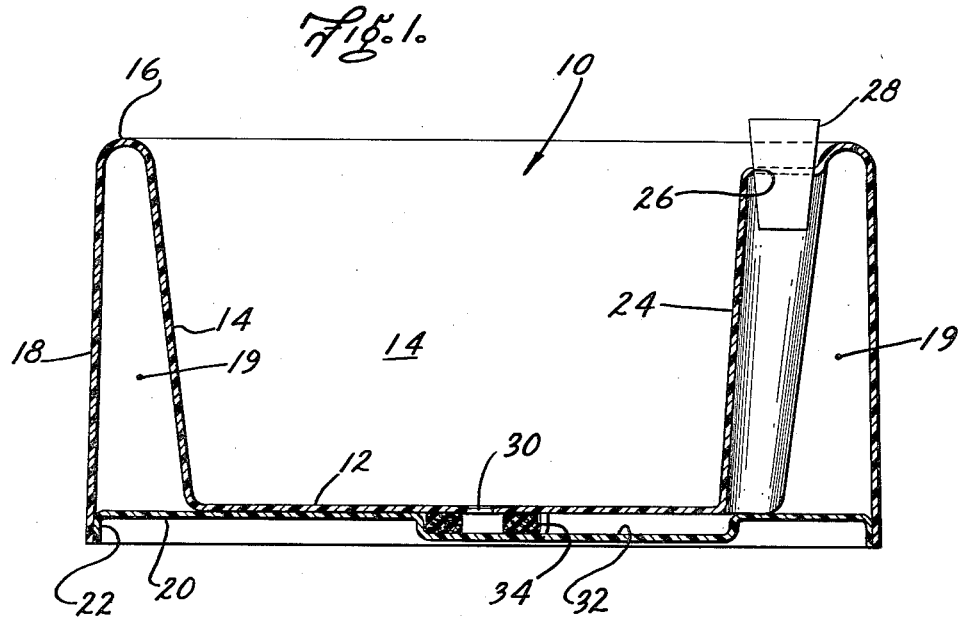
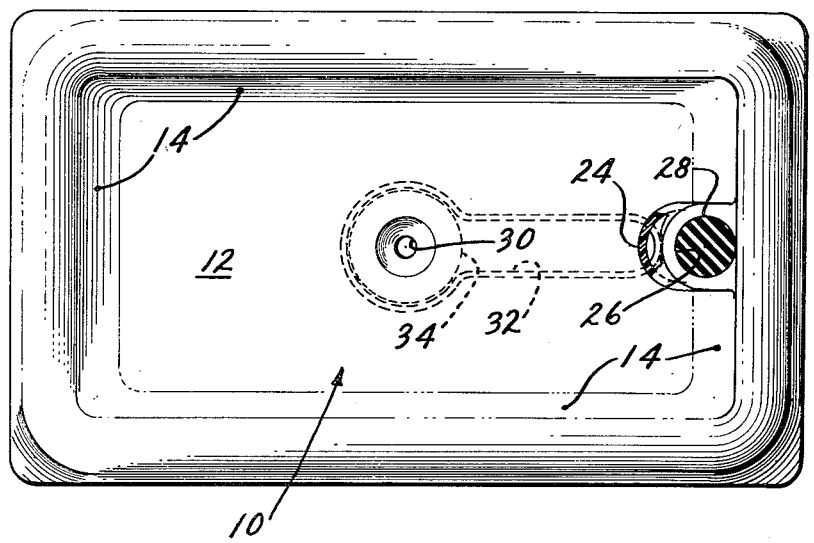
INVENTOR.
JAMES R. PETERS
BY Chapin & Neal
ATTORNEYS

United States Patent Office 3,043,053
Patented July 10, 1962

3,043,053
SELF-WATERING FLOWER POT
James R. Peters, Chicopee, Mass., assignor to Plastics Development Corporation, Calais, Vt.
Filed Nov. 16, 1959, Ser. No. 853,324
1 Claim. (Cl. 47—38)

The present invention relates to improvements in plant containers of the type requiring only infrequent attention and commonly referred to as self-watering flower pots.

The object of the invention is to provide a practical and economical self-watering flower pot which is further characterized by the proper degree of moisture being provided for the soil at all times over a prolonged period.

The constructional features of the invention will best be appreciated from a reading of the following description of the preferred embodiment disclosed in the accompanying drawing and the novelty thereof will be pointed out in the appended claim.

In the drawing:

FIG. 1 is an elevation, taken on section line I—I in FIG. 2, of a self-watering flower pot embodying my invention; and FIG. 2 is a plan view, with portions in section, of this flower pot.

The flower pot shown in the accompanying drawing is rectangular in outline and illustrates the adaptability of the self-watering features of the present invention to planters and like flower or plant containers which are particularly prone to being neglected and suffering from lack of water. It will, of course, be appreciated however that these same self-watering features can be adapted for use with the more conventional circular flower pots used by individual plants, and that the outline of the flower pot is of no special significance.

The self-watering flower pot herein disclosed is advantageously formed from molded plastic material, such as polyvinylchloride and comprises a thin-walled rectangular receptacle or container 10 for receiving the soil and plant. The receptacle 10 comprises a flat, horizontal bottom wall 12 which is integrally connected and blends with inner side walls 14. The side walls 14 are outwardly curved around top sections or top walls 16 which in turn blend with outer side walls 18. The side walls 14 and 18 and top walls 16, together define a chamber 19 which is sealed off at its lower end by a plate 20 which is bonded to the bottom wall 12 and has a downwardly turned lip 22 which is bonded to the outer walls 18. As herein used, the expression "walls" is inclusive of a cylindrical or like section which might otherwise be considered only a single wall. Thus, the walls 14 and 18 could as well be formed of cylindrical sections.

One of the side walls 14 is curved inwardly at 24 to form a filling column for the chamber 19. An opening 26 is provided in the column 24 to facilitate filling the chamber 19 with water. After the chamber 19 is filled, it is sealed off by a resilient plug 28.

An opening 30 is provided in the bottom wall 12 of the plant receptacle 10. A horizontal passageway 32 is molded in the plate 20 and places the container 10 in communication with the chamber 19 by way of the opening 30. The passageway 32 is enlarged in the area surrounding the opening 30. A flow-control pad 34 is disposed in this enlarged portion of the passageway and prevents free or direct communication with the chamber 19. The pad 34 is formed of open cell foamed polyurethane or like resin. A fair degree of latitude may be had in the density and structure of this flow control pad, so long as it serves the purposes later described. It will also be noted that felt wicking might also serve these purposes, but is not preferred because of the tendency for mold to grow on this organic material.

In use the plug 28 is removed so that the chamber 19 may be filled with water. This takes a very short time, during which water will flow directly into the bottom of the container 10. However, because of the restrictive effect of the pad 34, relatively little water enters the container in this short time. Once the plug 28 is inserted into the opening 26 and the chamber 19 again sealed tightly, atmospheric pressure will prevent this free flow. What little water flows into the container 10 at this time is readily absorbed by the soil therein. A condition of equilibrium would be set up eventually by atmospheric pressure preventing flow of water from the chamber 19, except that water is fed to the soil in the container 10 by capillary action through the flow-control pad 34, due to the contact of the soil in the plant receptacle 10 being in contact with the pad. As this capillary action occurs, air will filter through the pad 34 and enter the passageway 32. A bubble of air will be built up in the passageway 32 which will gradually approach the entrance of the passageway into the chamber 19. When the air bubble reaches the said entrance it will rise to the top of the chamber 19 and be replaced by a corresponding volume of water entering the passageway 32. The capillary action thus continues at substantially the same rate until the water in the chamber 19 is exhausted. The rate of water consumption is, of course, dependent on the moisture content of the soil in the container 10. Thus, a constant rate of capillary action assumes that the rate of evaporation of water from the soil is also constant. The porosity of the pad 34 is also a factor controlling the rate of water consumption.

The pad 34 is shown with a central hole aligned with the opening 30. This arrangement is preferred for giving a greater area of contact of the soil with the pad to facilitate the described capillary action. However, the primary point to be noted is that the pad 34 prevents free communication through the passageway 32 to the chamber 19.

The proportions of the self-watering flower pot have not been found critical. The only matter of criticality appears to exist in the cross sectional area of the passageway 32 which should not be so small that a meniscus will form which prevents an air bubble from reaching the interior of the chamber 19.

Various modifications of this disclosed embodiment are possible within the scope of my inventive concepts as set forth and defined in the following claim which are the measure of the limits of my invention.

Having disclosed the invention, what is claimed as novel and desired to be secured by Letters Patent of the United States is:

A self-watering flower pot comprising an integrally molded plastic container having a bottom wall merging with inner side walls and connected by curved top walls with outer side walls, said top walls and said inner and outer side walls defining in part a water chamber, a bottom plate secured to said side walls and defining the remainder of said chamber, one of said top walls having an opening therethrough for filling the chamber with water, a plug insertable in said opening and sealing the top of said chamber once it has been filled, said bottom wall having an opening therethrough, a horizontal passageway compositely formed by said bottom plate and said bottom wall, said passageway extending between said bottom wall opening and said chamber, said bottom plate being sealed to said bottom wall peripherally of said passageway, an open cell foamed plastic pad surrounding said opening and disposed therebeneath in said passageway, said sponge having an opening therethrough aligned with and substantially coextensive with said bottom wall opening.

References Cited in the file of this patent

UNITED STATES PATENTS

| 1,214,356 | Natvig | Jan. 30, 1917 |
| 1,631,409 | Finn | June 7, 1927 |
| 2,893,167 | Davidson | July 7, 1959 |

FOREIGN PATENTS

| 453,258 | France | June 4, 1913 |
| 1,078,471 | France | Nov. 18, 1954 |
| 867,180 | Germany | Feb. 16, 1953 |
| 14,554 | Great Britain | June 24, 1907 |
| 522,685 | Italy | Apr. 8, 1955 |
| 133,822 | Sweden | Dec. 4, 1951 |